United States Patent
Mattison et al.

(10) Patent No.: US 12,463,946 B2
(45) Date of Patent: Nov. 4, 2025

(54) TOUCHLESS API FOR FLEXIBLE DATA ROUTING IN A CLOUD-BASED NETWORK CONSORTIUM

(71) Applicant: BANK OF AMERICA CORPORATION, Charlotte, NC (US)

(72) Inventors: Paul Martin Mattison, Sherrills Ford, NC (US); Saurabh Garg, Haryana (IN); Maneesh Sethia, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 211 days.

(21) Appl. No.: 18/211,783

(22) Filed: Jun. 20, 2023

(65) Prior Publication Data
US 2024/0430241 A1    Dec. 26, 2024

(51) Int. Cl.
*H04L 9/40*    (2022.01)
*G06F 9/54*    (2006.01)
*H04L 9/32*    (2006.01)

(52) U.S. Cl.
CPC .......... *H04L 63/0428* (2013.01); *G06F 9/547* (2013.01); *H04L 9/3213* (2013.01)

(58) Field of Classification Search
CPC .... H04L 63/0428; H04L 9/3213; G06F 9/547
USPC ........................................................ 713/159
See application file for complete search history.

(56) References Cited

U.S. PATENT DOCUMENTS

| | | | |
|---|---|---|---|
| 8,346,663 B2 | 1/2013 | Kawan | |
| 9,313,660 B2 | 4/2016 | Chastain et al. | |
| 9,659,294 B2 | 5/2017 | Laracey | |
| 10,103,781 B2 | 10/2018 | Bellenger et al. | |
| 10,489,760 B2 | 11/2019 | Konecny et al. | |
| 10,728,728 B2 | 7/2020 | Levionnais et al. | |
| 10,735,432 B2 | 8/2020 | Bar et al. | |
| 10,922,631 B1 | 2/2021 | Shahidzadeh | |
| 11,128,468 B2 | 9/2021 | Gupta | |
| 11,388,116 B2 | 7/2022 | Kwatra et al. | |
| 11,552,943 B2 * | 1/2023 | Bendersky | H04L 63/0272 |
| 11,664,995 B2 | 5/2023 | Gupta | |
| 11,699,145 B1 * | 7/2023 | Yang | G06Q 20/1085 235/379 |
| 12,205,084 B1 * | 1/2025 | Stroke | G06Q 20/3829 |
| 2012/0089451 A1 | 4/2012 | Agramonte et al. | |
| 2013/0009756 A1 * | 1/2013 | Lu | G06K 7/10237 340/10.42 |
| 2013/0267174 A1 | 10/2013 | Moon et al. | |
| 2013/0317924 A1 | 11/2013 | Bush et al. | |

(Continued)

*Primary Examiner* — Dant B Shaifer Harriman
(74) *Attorney, Agent, or Firm* — Moore & Van Allen PLLC; Gabrielle M. Carlini

(57) ABSTRACT

Systems, computer program products, and methods are described herein for flexible data routing in a cloud-based network consortium. The method includes initiating an XR display for display on a user device and, in response to a first control signal, generating a nonfungible token (NFT) and transmitting a data packet over a secured network. The method further includes initiating, via the XR display, a secure application programming interface based on the NFT, geographic data, and a unique XR identification value, based on one or more data parameters, identifying a preferred data path, and, in response to a second control signal, performing an encrypted data exchange via the preferred data path.

17 Claims, 6 Drawing Sheets

(56) References Cited

U.S. PATENT DOCUMENTS

| | | | |
|---|---|---|---|
| 2014/0281525 A1* | 9/2014 | Acar | H04L 9/3226 |
| | | | 713/168 |
| 2019/0378024 A1 | 12/2019 | Singh et al. | |
| 2020/0242105 A1 | 7/2020 | Rich et al. | |
| 2022/0374902 A1* | 11/2022 | Sabintsev | G06Q 20/3676 |
| 2023/0281604 A1* | 9/2023 | Robell | G06Q 30/018 |
| 2023/0360323 A1* | 11/2023 | Jovanovic | G06F 3/0485 |
| 2023/0421827 A1* | 12/2023 | Gratton | H04L 9/3213 |
| 2024/0193878 A1* | 6/2024 | Witchey | G06Q 20/3825 |
| 2025/0016014 A1* | 1/2025 | Lang | H04M 15/41 |

\* cited by examiner

TOUCHLESS API FOR FLEXIBLE DATA ROUTING IN A CLOUD-BASED NETWORK CONSORTIUM

TECHNOLOGICAL FIELD

Example embodiments of the present disclosure relate to a touchless application programming interface ("API") for flexible data routing in a cloud-based network consortium.

BACKGROUND

In conventional data exchange systems, a user may be authenticated at a terminal device using a variety of authentication credentials such as a physical card, fingerprint scan, voice recognition, and the like. However, these existing systems require that a user physically interact with the terminal device. As such, a need exists for secure, contactless data exchange between a user device and a terminal device.

Applicant has identified a number of deficiencies and problems associated with conventional methods of data routing in a network consortium. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for flexible data routing in a cloud-based network consortium.

In one aspect, a system for flexible data routing in a cloud-based network consortium is presented. The system may include at least one non-transitory storage device and at least one processor coupled to the at least one non-transitory storage device, where the processing device is configured to execute computer program code comprising computer instructions configured to cause said at least one processor to perform the following operations: initiate an XR display for display on a user device; in response to a first control signal, generate a nonfungible token (NFT) and transmit a data packet over a secured network; initiate, via the XR display, a secure application programming interface (API) based on the NFT, geographic data, and a unique XR identification value; based on one or more data parameters, identify a preferred data path; and in response to a second control signal, perform an encrypted data exchange via the preferred data path.

In some embodiments, executing the instructions further causes the processing device to, based on the unique XR identification value, perform a reverse lookup to identify a user associated with the user device.

In some embodiments, the one or more data parameters includes a binary value associated with the user.

In some embodiments, executing the instructions further causes the processing device to establish a near field communication (NFC) connection between the user device and a terminal device.

In some embodiments, the terminal device is configured to establish a remote connection with one or more secure networks.

In some embodiments, the one or more parameters includes a proximity of the terminal device to one or more servers associated with the one or more secure networks.

In some embodiments, the one or more secure networks belong to a network consortium.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
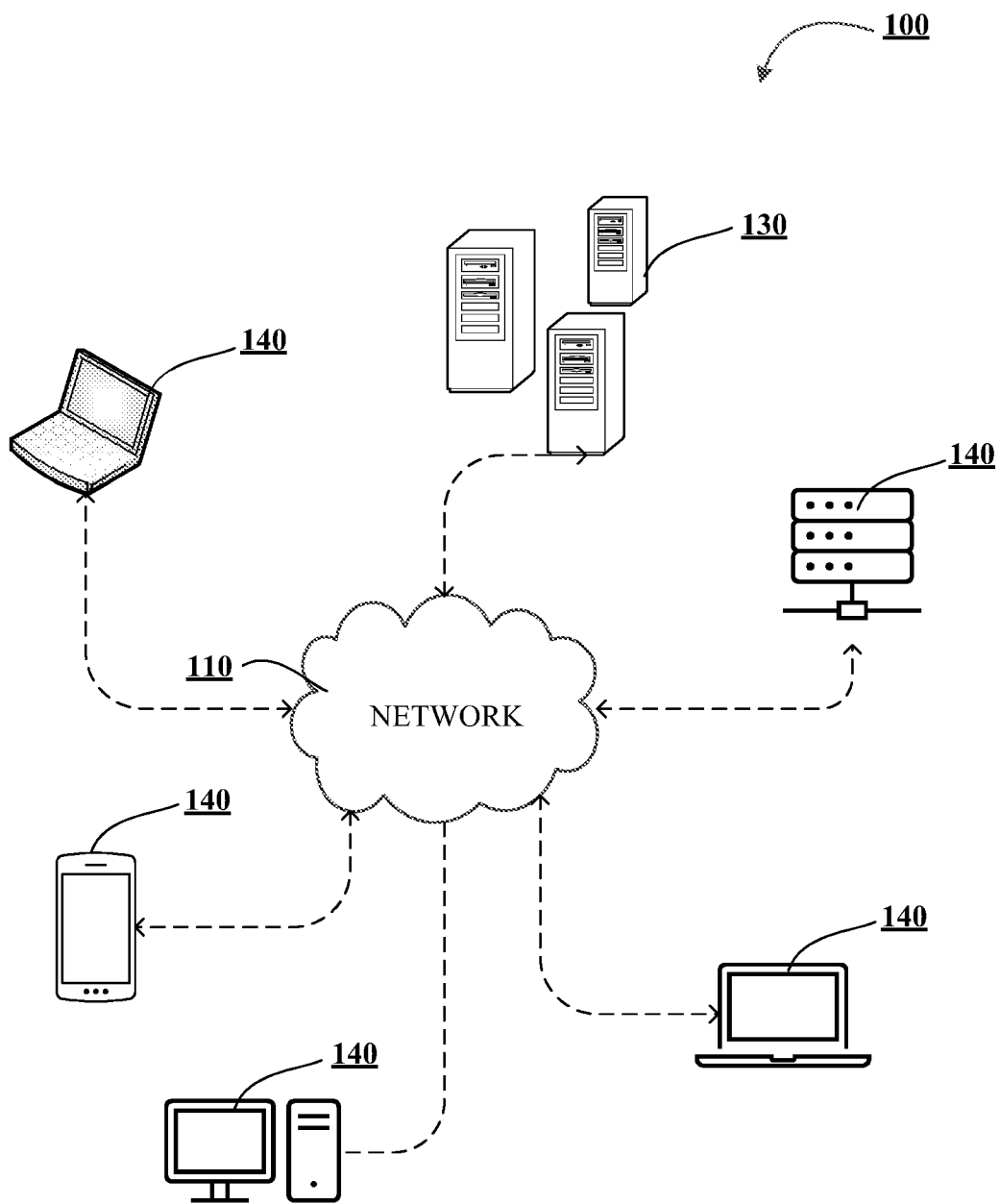
Figure 1B:
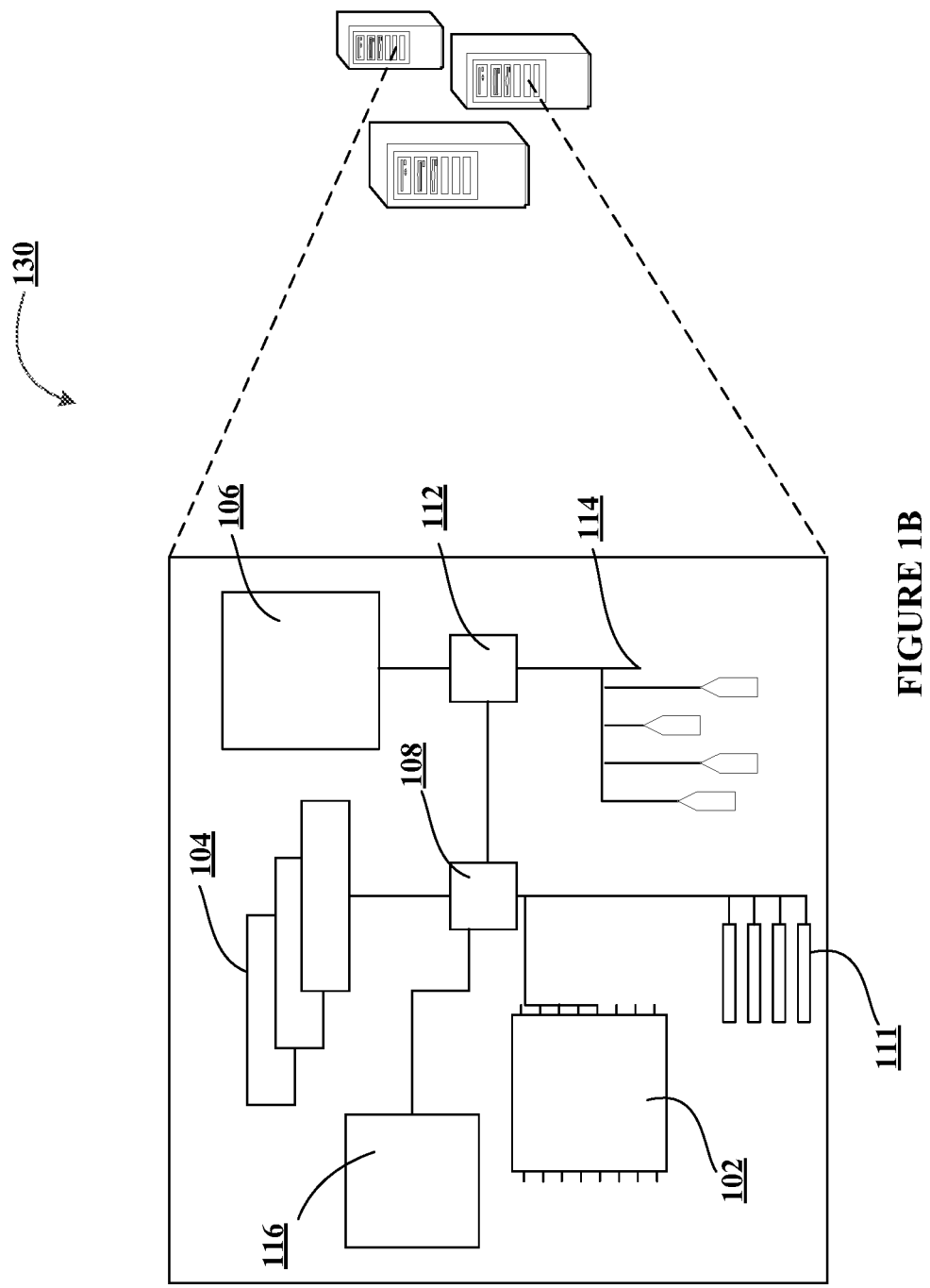
Figure 1C:
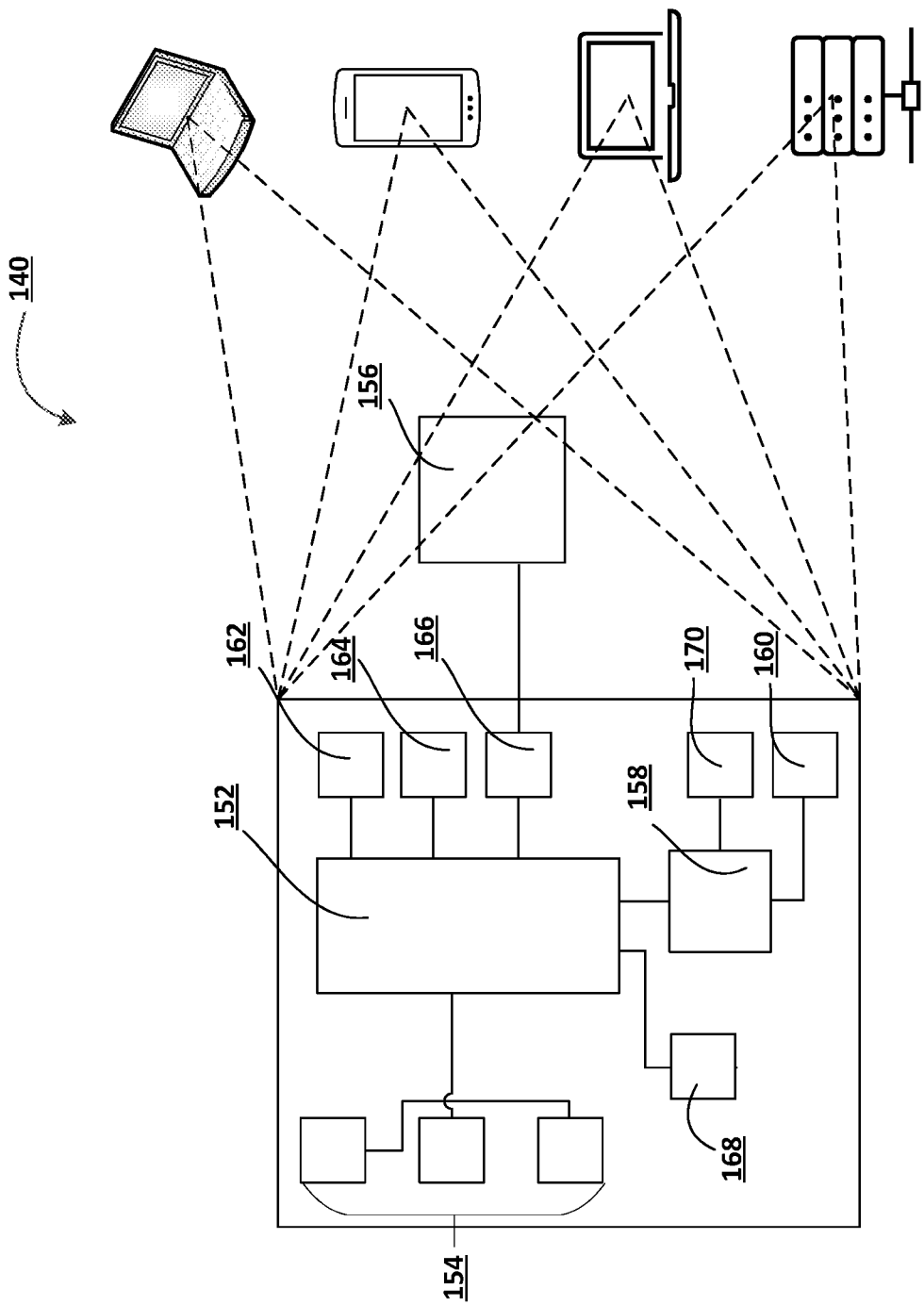
Figure 2A:
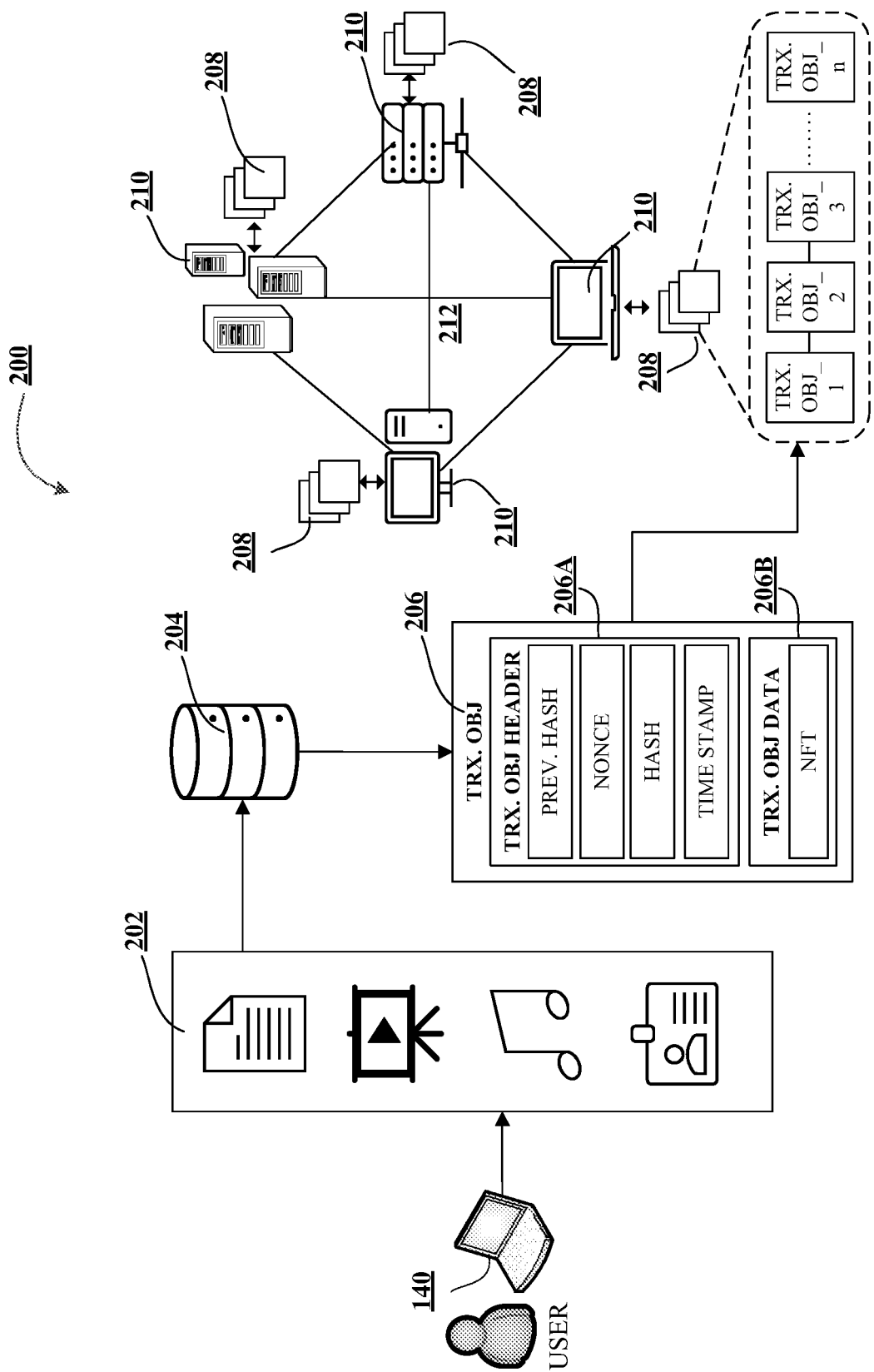
Figure 2B:
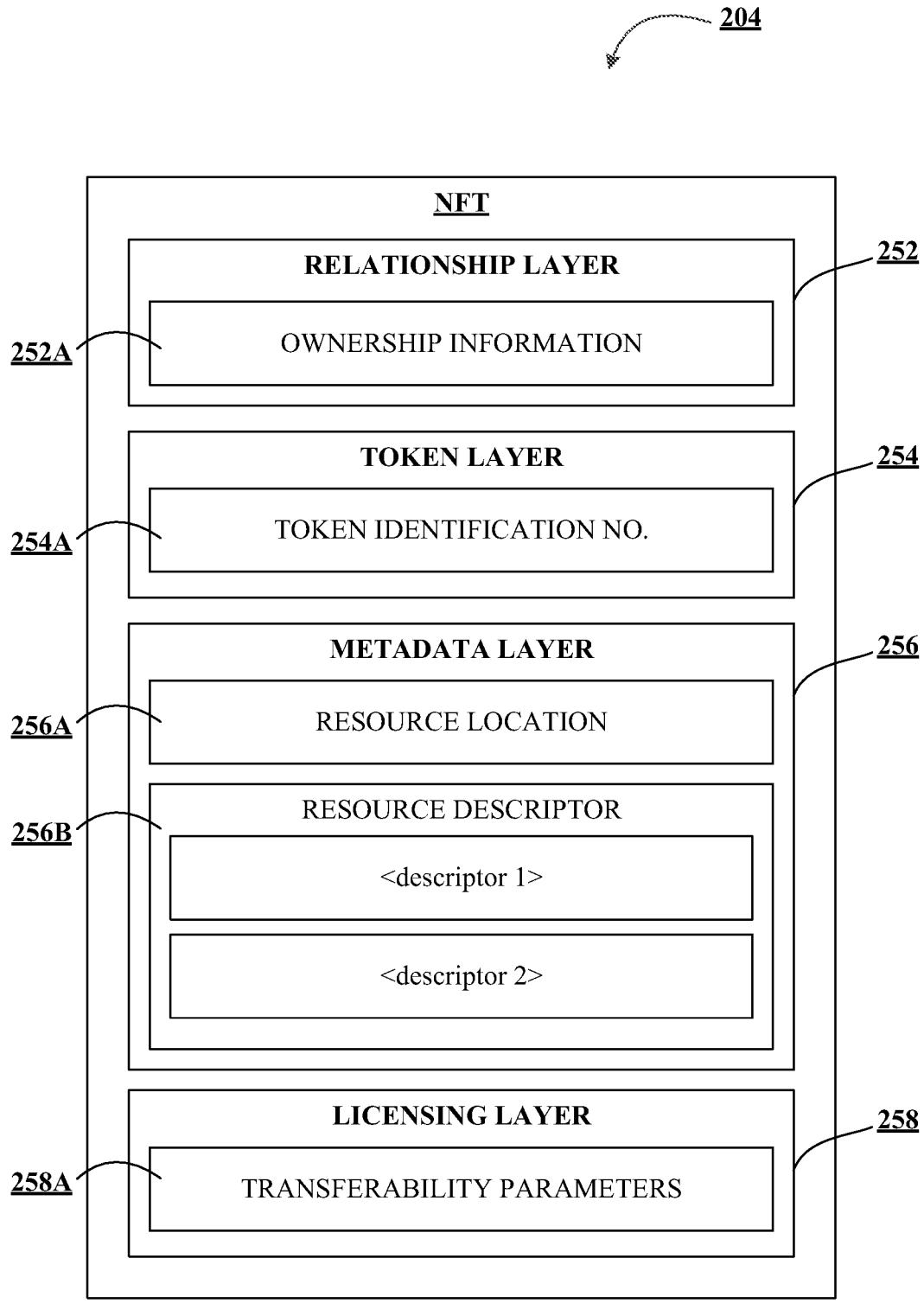
Figure 3:
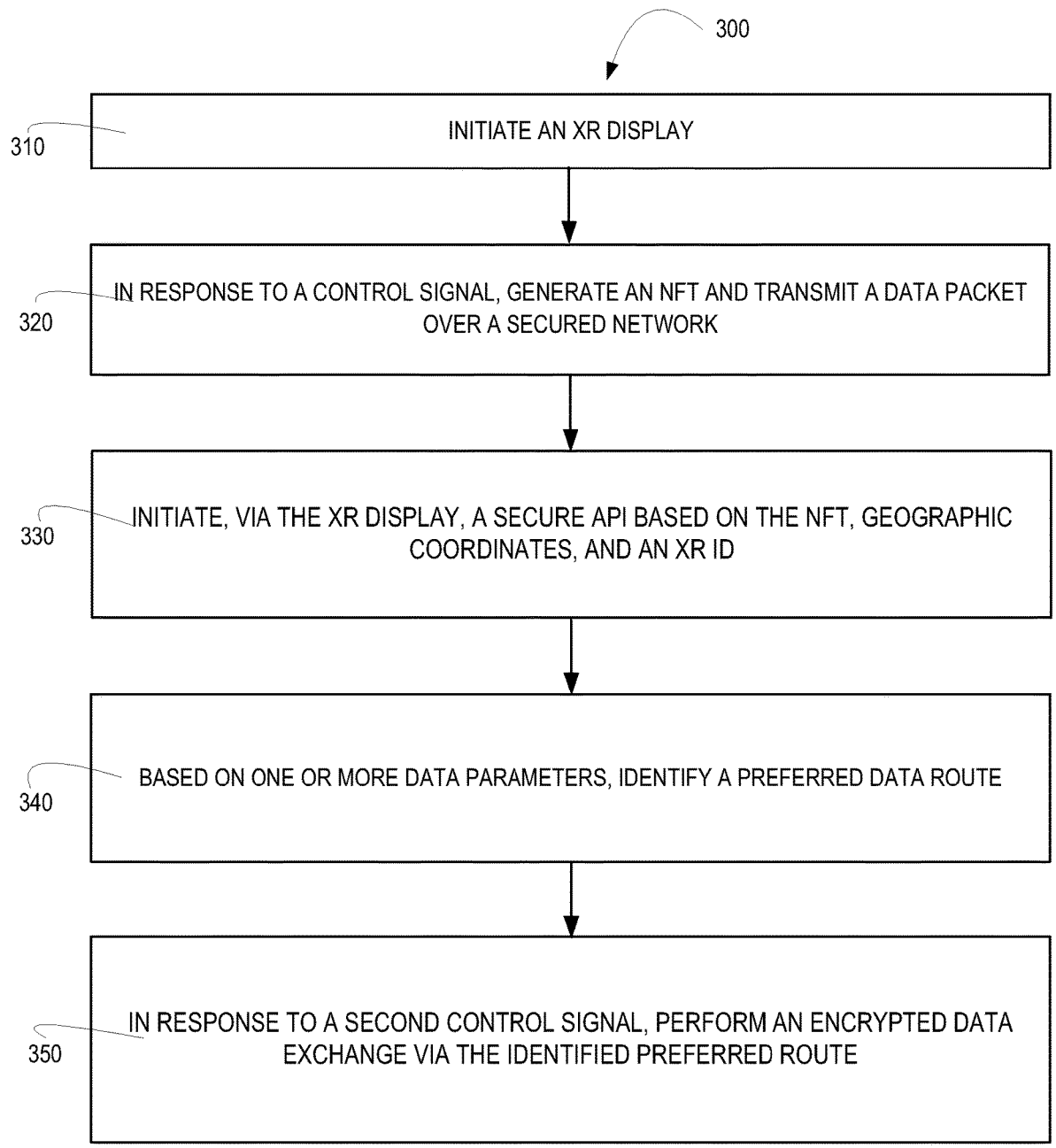

FIGS. 1A-1C illustrates technical components of an exemplary distributed computing environment for flexible data routing in a cloud-based network consortium, in accordance with an embodiment of the disclosure;

FIG. 2A illustrates an exemplary process of creating an NFT, in accordance with an embodiment of the invention;

FIG. 2B illustrates an exemplary NFT, in accordance with an embodiment of an invention; and FIG. 3 illustrates a process flow for flexible data routing in a cloud-based network consortium, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

In conventional data exchange systems, a user may be authenticated at a terminal device (such as an ATM) using a variety of authentication credentials such as a physical card, fingerprint scan, voice recognition, and the like. However, these existing systems require that a user physically interact with the terminal device. As such, a need exists for secure, contactless data exchange between a user device and a terminal device. The system provided herein solves this problem by initiating an XR display on a user device, where the XR display is configured to receive user inputs. The system then uses a combination of a unique NFT, geographic coordinates, and an XR ID to authenticate a user at a particular terminal device. Once a user is authenticated, the system may launch a secure, touchless API between the user device and the terminal device such that the user may interact with the terminal device without making physical contact. Furthermore, the system may determine, based on one or more data parameters, an optimized data route for exchanging user data within a cloud-based network consortium.

What is more, the present disclosure provides a technical solution to a technical problem. Specifically, the present invention provides the functional benefit of providing a user with the ability to interact with a terminal device in an extended reality (XR) environment, thereby eliminating the need to physically interact with the terminal device, e.g., by touching the terminal device. XR may refer to all real-and-virtual combined environments and human-machine interactions generated by computing technology and wearables. Representative forms of XR may include augmented reality (AR), virtual reality (VR), mixed reality (MR), and the areas interpolated among them. The levels of virtuality range from partially sensory inputs to immersive virtuality, also called VR. In this regard, the present invention focuses on a touchless API which is represented within an XR environment. The user may visualize and interact with said API via an XR platform (accessible using a virtual/augmented/mixed reality device) and complete touchless interactions with a terminal device in real-time.

Furthermore, the use of an NFT in combination with geographic data in order to authenticate a user and verify an interaction as described herein represents an improvement over conventional security protocols, by allowing a user to engage in a touchless transaction while maintaining multiple layers of security between the user device and the network consortium. Thus, the claimed system yields a tangible technological benefit. Specifically, the claimed system is less vulnerable to hacking or other similar security threats than conventional systems.

FIGS. 1A-1C illustrate technical components of an exemplary distributed computing environment for flexible data routing in a cloud-based network consortium 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce-a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a process flow 300 for flexible data routing in a cloud-based network consortium, in accordance with an embodiment of the disclosure. The process flow may begin at block 310, where the system may be configured to initiate an XR display for display on a user device associated with a user. In some embodiments, the system may also be configured to establish an NFC connection between the user device and a terminal device (i.e. an end-point device such as an ATM or the like), and the XR display may be initiated in response to forming the NFC connection. In one aspect, the user device associated with the user may be a VR device. An exemplary VR device may be a head-mounted device that provides a virtual reality platform for the user. Such a device may include a stereoscopic head-mounted display (providing separate images for each eye), surround sound, and head motion tracking sensors (which may include gyroscopes, accelerometers, magnetometers, structured light systems, etc.).

In some embodiments, the terminal device may be configured to establish a remote connection with one or more secure networks in addition to the NFC connection between the terminal device and user device. The one or more secure networks may belong to, or comprise, a cloud-based network consortium. Thus, each network in the network consortium may be configured to perform secure data exchanges with each other network in the consortium.

The process flow may then continue to block 320, where, in response to a control signal received from the user device, the system may be configured to generate an NFT and transmit a data packet to the terminal device over a secured network. In some embodiments, the secured network may comprise the NFC connection. The NFT, described in greater detail with respect to FIGS. 2A and 2B, may be used to authenticate the connection between the user device and terminal device, while the data packet may comprise a first set of geographic coordinates associated with the user device, and/or a unique XR identification value associated with the user device.

The process flow may then continue to block 330, where the system may be configured to initiate, via the XR display, a secure API based on the NFT, the first set of geographic coordinates, and the unique XR identification value. In some embodiments, the system may further determine a second set of geographic coordinates associated with the terminal device and may be configured to initiate the secure API based on determining that the first and second set of geographic coordinates are within a predetermined threshold proximity to one another. Additionally or alternatively, the system may be configured to, based on the unique XR identification value, perform a reverse lookup using a remote data source to identify a user identification value associated with the XR identification value. Thus, the system may be configured to identify the user associated with the user device based on the XR identification value. Once the secure API is initiated, the system may be configured to receive instructions and/or commands to perform operations via a control signal received from the user through the secure API.

The process flow may then continue to block 340, wherein the system may be configured to, based on one or more data parameters, identify a preferred data path or route for a control signal received through the secure API. In some embodiments, a data parameter may include a binary value associated with the user. For example, the system may determine whether or not the user has an existing relationship with a primary network of the network consortium. If the user does have an existing relationship with the primary network, then the preferred data path may require rerouting the control signal through the terminal device to a remote server associated with the primary network. If the user does not have an existing relationship with the primary network, then the preferred data path may require rerouting the control signal through the terminal device to a network interchange configured to reroute the control signal to a remote server associated with a different network of the network consortium. In some embodiments, the one or more data parameters may include a proximity of the terminal device to one or more servers associated with the one or more secure networks of the network consortium. Additionally or alternatively, the one or more data parameters may include data associated with the control signal itself. The process flow may then continue to block 350, wherein the system may be configured to, in response to the control signal, perform an encrypted data exchange via the identified preferred data route or path. In some embodiments, the data exchange may be encrypted via NIST SP 800 encryption and/or a similar encryption protocol.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for flexible data routing in a cloud-based network consortium, the system comprising:
   a processing device;
   a non-transitory storage device containing instructions when executed by the processing device, causes the processing device to perform the steps of:
   initiate an XR display for display on a user device;
   in response to a first control signal, generate a nonfungible token (NFT) and transmit a data packet over a first secured network to a terminal device, wherein the data packet comprises the NFT, a first set of geographic data associated with the user device, and a unique XR identification value;
   initiate, via the XR display, a secure application programming interface (API) based on the NFT, the first set of geographic data, and the unique XR identification value;
   based on one or more data parameters, identify a preferred data path, wherein the one or more data parameters comprise at least a proximity of the terminal device to one or more servers associated with one or more second secure networks; and
   in response to a second control signal, perform an encrypted data exchange via the preferred data path, wherein the encrypted data exchange comprises a transaction event associated with a user of the user device.

2. The system of claim 1, wherein executing the instructions further causes the processing device to:

based on the unique XR identification value, perform a reverse lookup to identify the user associated with the user device.

3. The system of claim 2, wherein the one or more data parameters further comprises a binary value associated with the user.

4. The system of claim 1, wherein the first secured network comprises a near field communication (NFC) connection between the user device and the terminal device.

5. The system of claim 1, wherein the terminal device is configured to establish a remote connection with the one or more second secure networks to execute the transaction event.

6. The system of claim 1, wherein the one or more second secure networks comprise a network consortium.

7. A computer program product for flexible data routing in a cloud-based network consortium, the computer program product comprising a non-transitory computer-readable medium comprising code causing an apparatus to:
   initiate an XR display for display on a user device;
   in response to a first control signal, generate a nonfungible token (NFT) and transmit a data packet over a first secured network to a terminal device, wherein the data packet comprises the NFT, a first set of geographic data associated with the user device, and a unique XR identification value;
   initiate, via the XR display, a secure application programming interface (API) based on the NFT, the first set of geographic data, and the unique XR identification value;
   based on one or more data parameters, identify a preferred data path, wherein the one or more data parameters comprise at least a proximity of the terminal device to one or more servers associated with one or more second secure networks; and
   in response to a second control signal, perform an encrypted data exchange via the preferred data path, wherein the encrypted data exchange comprises a transaction event associated with a user of the user device.

8. The computer program product of claim 7, wherein the code further causes the apparatus to:
   based on the unique XR identification value, perform a reverse lookup to identify the user associated with the user device.

9. The computer program product of claim 8, wherein the one or more data parameters further comprises a binary value associated with the user.

10. The computer program product of claim 7, wherein the first secured network comprises a near field communication (NFC) connection between the user device and the terminal device.

11. The computer program product of claim 7, wherein the terminal device is configured to establish a remote connection with the one or more second secure networks to execute the transaction event.

12. The computer program product of claim 7, wherein the one or more second secure networks comprise a network consortium.

13. A method for flexible data routing in a cloud-based network consortium, the method comprising:
   initiating an XR display for display on a user device;
   in response to a first control signal, generating a nonfungible token (NFT) and transmitting a data packet over a first secured network to a terminal device, wherein the data packet comprises the NFT, a first set of geographic data associated with the user device, and a unique XR identification value;

initiating, via the XR display, a secure application programming interface (API) based on the NFT, the first set of geographic data, and the unique XR identification value;

based on one or more data parameters, identifying a preferred data path, wherein the one or more data parameters comprise at least a proximity of the terminal device to one or more servers associated with one or more second secure networks; and in response to a second control signal, performing an encrypted data exchange via the preferred data path, wherein the encrypted data exchange comprises a transaction event associated with a user of the user device.

14. The method of claim 13, wherein the method further comprises:

based on the unique XR identification value, performing a reverse lookup to identify the user associated with the user device.

15. The method of claim 14, wherein the one or more data parameters further comprises a binary value associated with the user.

16. The method of claim 13, wherein the first secured network comprises a near field communication (NFC) connection between the user device and the terminal device, wherein the terminal device is configured to establish a remote connection with the one or more second secure networks to execute the transaction event.

17. The method of claim 13, wherein the one or more second secure networks comprise a network consortium.

* * * * *